United States Patent
Park

(10) Patent No.: US 9,692,862 B2
(45) Date of Patent: Jun. 27, 2017

(54) CAMERA DEVICE AND WEARABLE ELECTRONIC DEVICE HAVING THE SAME

(71) Applicant: Samsung Electronics Co., Ltd., Suwon-si, Gyeonggi-do (KR)

(72) Inventor: Su-Jin Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/683,629

(22) Filed: Apr. 10, 2015

(65) Prior Publication Data

US 2016/0119520 A1   Apr. 28, 2016

(30) Foreign Application Priority Data

Oct. 23, 2014  (KR) .................. 10-2014-0144175
Feb. 25, 2015  (KR) .................. 10-2015-0026784

(51) Int. Cl.
| | | |
|---|---|---|
| H04M 1/02 | (2006.01) | |
| H04N 5/225 | (2006.01) | |
| G03B 11/00 | (2006.01) | |
| G03B 11/04 | (2006.01) | |
| G03B 17/02 | (2006.01) | |
| G03B 29/00 | (2006.01) | |

(52) U.S. Cl.
CPC ........ *H04M 1/0264* (2013.01); *H04N 5/2257* (2013.01); *G03B 11/00* (2013.01); *G03B 11/045* (2013.01); *G03B 17/02* (2013.01); *G03B 29/00* (2013.01); *H04M 2250/52* (2013.01)

(58) Field of Classification Search
None
See application file for complete search history.

(56) References Cited

U.S. PATENT DOCUMENTS

| | | | | |
|---|---|---|---|---|
| 2010/0253832 | A1* | 10/2010 | Duparre | ............ H01L 27/14618 348/360 |
| 2012/0263451 | A1* | 10/2012 | Sechrist | ............... G03B 11/045 396/428 |
| 2014/0226062 | A1* | 8/2014 | Parrill | .................. H04N 5/2252 348/376 |
| 2015/0256729 | A1* | 9/2015 | Wato | .................... G03B 11/045 348/311 |
| 2016/0012269 | A1* | 1/2016 | Kowalczyk | ............ G06K 7/146 235/462.21 |
| 2016/0119509 | A1* | 4/2016 | Wato | .................... H04N 5/2251 348/148 |

OTHER PUBLICATIONS

U.S. Statutory Invention Registration No. H654, Doyle, Jr. et al., Jul. 4, 1989.

* cited by examiner

*Primary Examiner* — Justin P Misleh
(74) *Attorney, Agent, or Firm* — Jefferson IP Law, LLP

(57) ABSTRACT

A camera device is provided. The camera device includes a camera module in which a lens assembly is disposed and a camera window provided on a surface of the camera module, and including a projection part inclined by a predetermined angle in relation to the camera module and coupled to the camera module. The projection part may comprise a size corresponding to an angle of view of the camera module.

11 Claims, 13 Drawing Sheets
(1 of 13 Drawing Sheet(s) Filed in Color)

CAMERA DEVICE AND WEARABLE ELECTRONIC DEVICE HAVING THE SAME

CROSS-REFERENCE TO RELATED APPLICATION(S)

This application claims the benefit under 35 U.S.C. §119(a) of a Korean patent application filed on Oct. 23, 2014 in the Korean Intellectual Property Office and assigned Serial number 10-2014-0144175, and of a Korean patent application filed on Feb. 25, 2015 in the Korean Intellectual Property Office and assigned Serial number 10-2015-0026784, the entire disclosure of each of which is hereby incorporated by reference.

TECHNICAL FIELD

The present disclosure relates to a camera device and an electronic device having the same.

BACKGROUND

An electronic device refers to a device that executes a specific function according to a program installed therein, such as a home appliance, a digital diary, a portable multimedia player, a mobile communication terminal, a tablet Personal Computer (PC), a video/audio device, a desktop/laptop PC, or a vehicle navigation system. Recently, various functions are incorporated in one electronic device, such as a mobile communication terminal. For example, in a mobile communication terminal among electronic devices appropriately sized to be carried, an entertainment function, such as a game, a multimedia function such as music/video reproduction, a communication and security function for mobile banking or the like, and functions such as scheduling management or electronic wallet are integrated in one electronic device in addition to an ordinary communication function.

The electronic devices are equipped with various modules in which, for example, a camera lens assembly capable of capturing a photograph or a video image (hereinafter, referred to as a "camera module" or a "'camera device") is available. Recently, the camera device is also equipped in an electronic device referred to as a wearable device.

As discussed above, a camera device equipped in, for example, a portable or miniaturized electronic device or a wearable electronic device should have a structure having an opening on a surface of the electronic device so that the camera device is exposed on the surface of the electronic device. When the camera device is exposed on the surface of the electronic device, a transparent window may be provided on the opening of the electronic device so as to allow an image to be captured by the camera device while protecting the camera device equipped inside the electronic device.

When the camera device is equipped in the electronic device, the camera device is provided to be oriented in the same direction as the surface of the electronic device. That is, the surface and the window of the electronic device and the camera device are positioned in a direction perpendicular to a direction where an image is input to the camera device.

However, recent electronic devices have surfaces formed in various shapes, for example, a surface formed in a curved shape or a shape bent to have a predetermined angle. In addition, an electronic device miniaturized to be disposed on a human body, such as a wearable electronic device is ergonomically designed so as to allow the electronic device to be comfortably disposed on the human body.

As a result, the surface and the window of the electronic device and the camera device may be equipped at different angles.

FIG. 1 is a cross-sectional view illustrating a camera device and an electronic device which are equipped with a predetermined angle being formed therebetween according to the related art. FIG. 2 is a plan view illustrating an angle of view (AOV) shape when the camera device and the electronic device have the predetermined angle therebetween according to the related art. FIG. 3 is a view illustrating a photograph internally reflected according to stray light introduced through a projection part when the camera device forms the predetermined angle with the electronic device according to the related art.

Referring to FIGS. 1 to 3, in the case of a camera device 11 provided in an electronic device, such as a watch type wearable device, the camera device 11 may be equipped such that an image may be introduced through an inclined surface of the electronic device.

The camera device 11 may be mounted on an inner surface of the electronic device to have a predetermined angle with respect to the surface of the electronic device as described above. On the surface of the electronic device, a camera window 12 may be mounted so as to allow an image to fall on the camera device 11 while protecting the camera device 11.

The camera window 12 may be provided to form a surface coplanar with the surface of the electronic device. Accordingly, the camera device 11 equipped inside the electronic device may form a predetermined angle with the surface of the camera window 12 rather than being parallel to the surface of the camera window 12. On the camera window 12, a projection part 12a having a predetermined shape, for example, a circular shape or a rectangular shape so as to allow an image to be input to the lens of the camera device 11.

As the camera device 11 and the camera window 12 are provided to be inclined to each other, the distance therebetween is varied and hence, an AOV is varied depending on the positions of the camera device and the camera window.

Specifically, assuming that the AOV of the camera device 11 is divided into three portions, i.e., a portion A, a portion B, and a portion C depending on the positions thereof, the portion A is positioned adjacent to the camera device 11 and the portion C is positioned at the furthermost positioned compared to the portions A and B. As a mounting angle occurs between the camera device 11 and the camera window 12, the AOV shape of the camera device 11 may be formed in a trapezoidal profile (see FIG. 2). For example, when the resolution of the camera device 11 is 1280×1080, the AOV may be formed in a truncated pyramid shape in a ratio of 16:9 when viewed from the front side. However, transparent window 12a may be formed in a rectangular or circular shape without considering the AOV occurring according to the mounting angle of the camera device 11.

When the transparent window 12a is formed in a rectangular shape on the camera window 12, i.e., in a rectangular shape with reference to the position of the portion C, the transparent window 12a is formed largely at the position of the portion A compared to the practical AOV. Accordingly, stray light may be introduced into the lens of the camera device 11 from a light source positioned outside the AOV of the camera device 12. The stray light introduced into the lens of the camera device 11 may internal reflect and result in a flare phenomenon as shown in FIG. 3.

The above information is presented as background information only to assist with an understanding of the present disclosure. No determination has been made, and no assertion is made, as to whether any of the above might be applicable as prior art with regard to the present disclosure.

SUMMARY

As described above, when the camera device and the camera window are positioned with a predetermined angle therebetween, a portion, in which the transparent window is larger than the angle of view (AOV) of the camera device, may occur. As a result, at the portion where the transparent window is formed to be larger than the AOV, stray light may be introduced into the lens of the camera device, and as a result, a flare phenomenon due to an internal reflection, may occur.

Aspects of the present disclosure are to address at least the above-mentioned problems and/or disadvantages and to provide at least the advantages described below. Accordingly, an aspect of the present disclosure is to provide a camera device in which a transparent window formed on a camera window is capable of having a shape corresponding to an AOV of the camera device when the camera device is provided to be inclined in relation to the camera window.

Another aspect of the present disclosure is to provide a camera device capable of preventing the introduction of stray light into a lens of the camera device when the camera device is provided to be inclined by a predetermined angle in relation to the camera window.

In accordance with an aspect of the present disclosure, a camera device is provided. The camera device includes a camera module in which a lens assembly is disposed and a camera window provided on a surface of the camera module, and including a projection part inclined by a predetermined angle in relation to the camera module and coupled to the camera module. The projection part may comprise a size corresponding to an AOV of the camera module.

In accordance with another aspect of the present disclosure, a camera device is provided. The camera device includes a camera module in which a lens assembly is disposed, a camera window disposed on a surface of the camera module, and including a projection part inclined by a predetermined angle in relation to the camera module and comprising a trapezoidal shape corresponding to an AOV of the camera module and a bezel that shields a peripheral portion of the projection part, and a shielding member comprising a shape corresponding to the shape of the projection part and disposed between the camera window and the camera module.

In accordance with another aspect of the present disclosure, an electronic device with a camera device is provided. The electronic device includes a camera module disposed inside an inclined part provided to be inclined on a body of the electronic device and a camera window on a surface of the inclined part to cover the camera module. The camera window is provided with the camera device in which the camera device includes a transparent projection part corresponding to an AOV of the camera module and an opaque bezel around the projection part.

In accordance with another aspect of the present disclosure, a camera device is provided. The camera device includes a camera module provided with a lens assembly, a camera window positioned in a direction of the camera module to be inclined by a predetermined angle, a projection part formed on the camera window and having a size corresponding to an AOV of the camera module, a shielding member disposed between the camera window and the camera module, and a cavity disposed in the shielding member and comprising an AOV shape so that one side of the cavity corresponds to the projection part and the other side of the cavity corresponds to a lens opening of the lens assembly.

In accordance with another aspect of the present disclosure, an electronic device with the above-described camera device is provided. The electronic device includes a body and an inclined part formed to be inclined from the body, in which the inclined part is provided with an opening in which the camera window is disposed.

According to various embodiments of the present disclosure, since the transparent window of the camera window is formed to be suitable for the AOV of the camera device, the camera device is capable of preventing the introduction of stray light into a lens of the camera device.

In addition, since the transparent window is formed to have a shape corresponding to the AOV of the camera lens, it is possible to prevent a flare phenomenon such as internal reflection on an image of the camera device.

Further, the shielding member according to an embodiment of the present disclosure is provided with a protrusion having a cavity formed therein in an AOV shape, more specifically, a truncated pyramid shape. Thus, stray light, other than a captured image introduced into the camera module, can be blocked.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
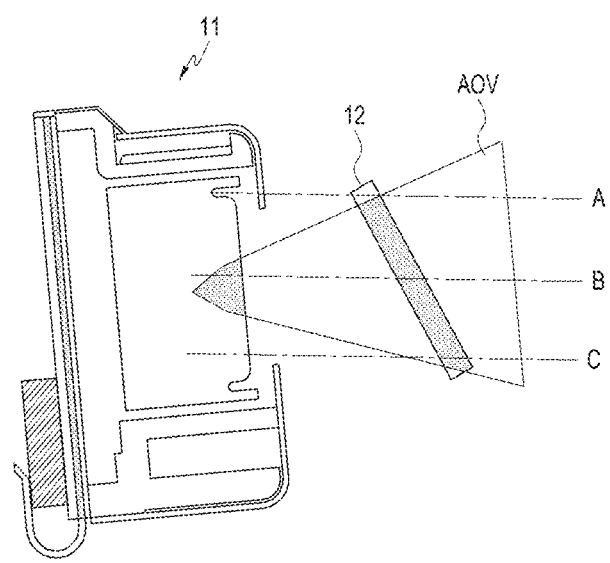
FIG. 1 is a cross-sectional view illustrating a camera device mounted to form a predetermined angle with an electronic device which are equipped with a predetermined angle being formed therebetween according to the related art.
Figure 2:
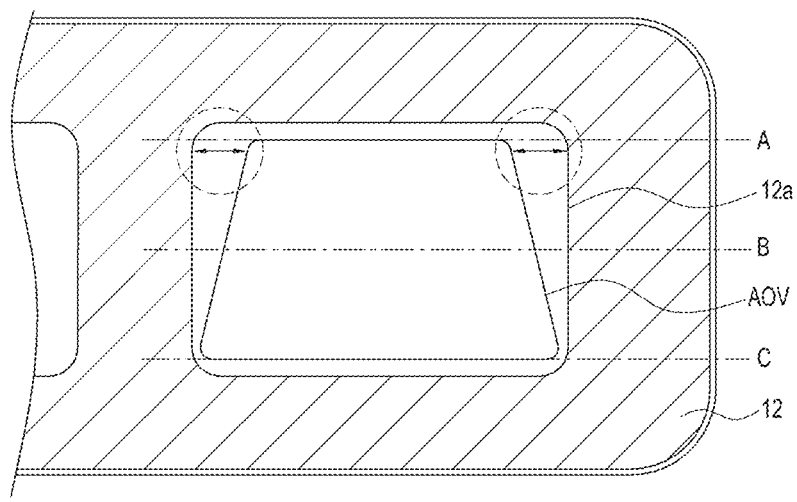
FIG. 2 is a plan view illustrating a shape of an angle of view (AOV) when a camera device and an electronic device have a predetermined angle therebetween according to the related art.
Figure 3:
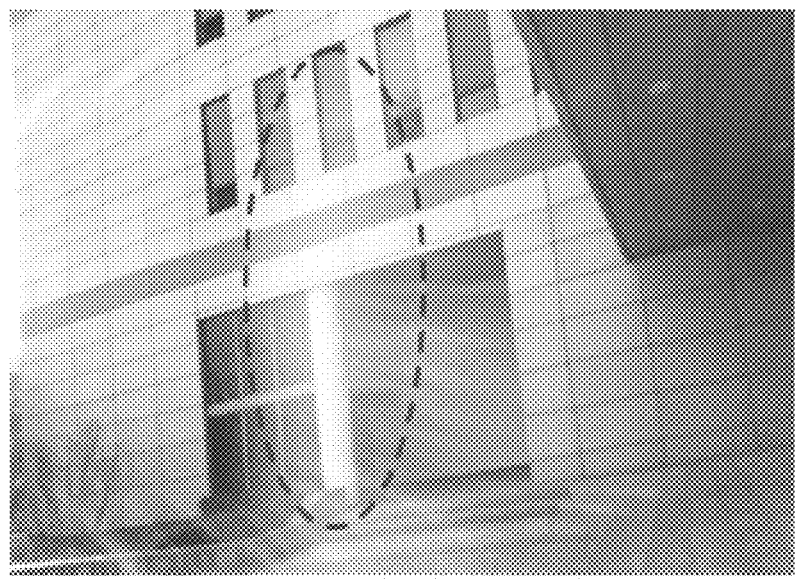
FIG. 3 is a view illustrating a photograph internally reflected according to stray light introduced through a projection part when a camera device and an electronic device have a predetermined angle therebetween according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the terms "include" or "may include", which may be used in various embodiments of the present disclosure, refer to the presence of disclosed functions, operations or elements, and do not restrict the addition of one or more functions, operations or elements. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

The term "or" in various embodiments of the disclosure means the inclusion of at least one or all of the disclosed elements. For example, the expression "A or B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the corresponding elements. The expressions may be used to distinguish a component element from another component element. For example, a first user device and a second user device indicate different user devices although both of them are user devices. For example, a first constituent element may be termed a second constituent element, and likewise a second constituent element may also be termed a first constituent element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, a camera, or a wearable device (e.g., a head-mounted-device (HMD) such as electronic glasses, electronic clothes, an electronic bracelet, an electronic necklace, an electronic appcessory, an electronic tattoo, or a smart watch).

According to various embodiments of the present disclosure, the electronic device may be a smart home appliance with a communication function. The smart home appliances may include at least one of, for example, televisions (TVs), digital versatile disc (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, or a point of sales (POS) of a shop.

According to various embodiments of the present disclosure, the electronic device may include at least one of a part of furniture or a building/structure having a communication function, an electronic board, an electronic signature receiving device, a projector, or various kinds of measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

An electronic device including a camera device according to various embodiments of the present disclosure may be a smart phone, a portable phone, a navigation device, a game console, TV, a head unit for vehicles, a notebook computer, a laptop computer, a tablet computer, a PMP, a PDA, and the like, or may be embodied as a pocket-size portable communication terminal including a wireless communication function. Further, the electronic device may be a flexible device or a flexible display unit.

Hereinafter, a camera device according to various embodiments and an electronic device having the same will be described with reference to FIGS. 4 to 7 enclosed herein. In the following, the term "user" used in various embodiments of the present disclosure may refer to a person or a device (e.g., an artificial intelligence electronic device) using the electronic device.

In addition, hereinafter various embodiments of a camera device and an electronic device having the same will be described. However, each embodiment described below is merely one embodiment among various embodiments of the camera device and the electronic device, and may be variously modified or changed according to various conditions such as a stacked state and shape of the camera device as well as a stacked configuration and shape of the electronic device without.

Figure 4:
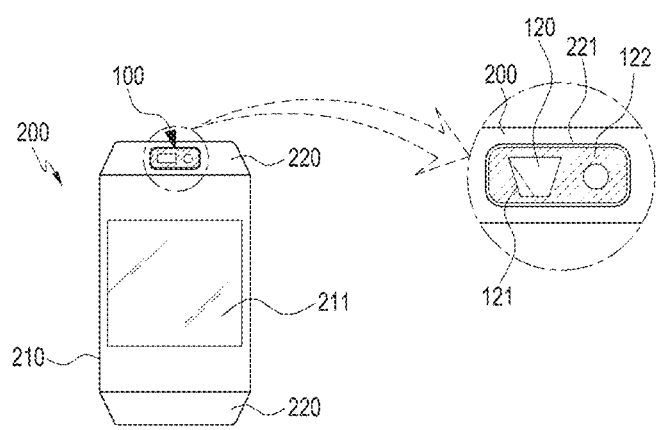
FIG. 4 is a view schematically illustrating an electronic device including a camera device according to an embodiment of the present disclosure.
Figure 5:
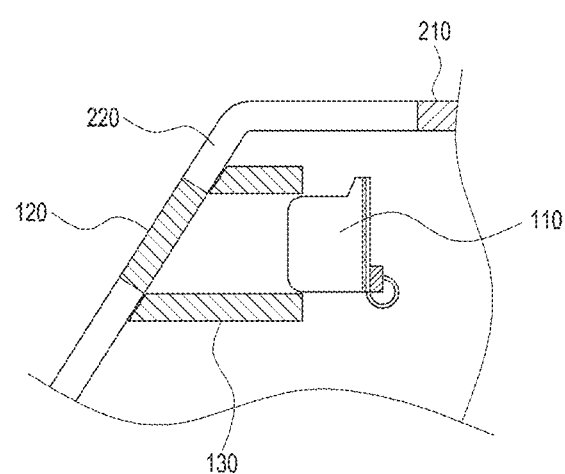
FIG. 5 is a cross-sectional view of an electronic device including a camera device according to an embodiment of the present disclosure.

FIG. 4 is a view schematically illustrating an electronic device including a camera device according to an embodiment of the present disclosure. FIG. 5 is a cross-sectional view of an electronic device including a camera device according to an embodiment of the present disclosure.

Referring to FIGS. 4 and 5, according to an embodiment of the present disclosure, an electronic device 200 may include a body 210, an inclined part 220 inclined by a predetermined angle on the body 210, a camera window 120, and a camera module 110. Descriptions will be made assuming that the electronic device 200 according to an embodiment of the present disclosure is a watch type wearable electronic device 200, as an example. Thus, according to an embodiment of the present disclosure, the electronic device 200 is provided with a body 210, and a band part (not illustrated) connecting the body 210 with a user's body, in which the inclined part 220 may be positioned between the body 210 and the band part and a camera module 110 described later may be mounted inside the inclined part 220.

The body 210 may be provided with a display device 211, and various peripheral modules, such as an input button, a speaker, a microphone device, and a camera device 100 may be mounted near the display device 211.

The inclined part 220 may be bent from the body toward the user's body so as to form a predetermined curvature radius or a predetermined angle with reference to the body 210 for allowing the bending of the band part or for convenience of wearing the electronic device on the user's body. An opening 221 may be formed in the inclined part 220 and a camera window 120 may be mounted in the opening 221 so as to introduce an image to a camera module 110 mounted inside the body 210. The camera window 120 and the camera module 110 (described later) may be mounted inside the body 210 so as to introduce the image through the inclined part 220. A lens module provided in the camera module 110 may form a predetermined angle in relation to the camera window 120.

As described above, descriptions will be made assuming that according to an embodiment of the present disclosure, the electronic device 200 is a watch type wearable electronic device 200, for example. However, this is an example merely for description, and the electronic device 200 may be variously changed or modified as long as the camera module 110 is provided at a position where the electronic device has a surface with a curvature or an inclined surface.

According to an embodiment of the present disclosure, the camera device 100 may include a camera module 110, a camera window 120, and a shielding member 130. The camera module 110 may include, for example, a lens assembly (not illustrated), a housing (not illustrated) that accommodates the lens assembly, and a decoration unit (not illustrated). Although not illustrated, the lens assembly may include, for example, one or more stacked lens modules, an image module, and a flexible circuit board. The camera may further include, for example, a driving unit for autofocusing of the lens modules or image correction.

The housing is configured to accommodate the lens assembly, and although not illustrated, may be mounted to be electrically connected to a circuit board provided inside the body 210 of the electronic device 200. The housing may be an injection-molded product.

The decoration unit may be provided along the outer circumference of the camera window 120 so as to increase a coupling force between the body 210 and the camera window 120, and to implement a luxurious design.

The camera window 120 may be mounted so as to cover the opening 221 of the inclined part 220 provided in the body 210 and to form a surface coplanar with the surface of the inclined part 220. When the camera window 120 is mounted in the opening 221, the camera window 120 covers one surface of the camera module 110 mounted inside the opening 221. As the camera window 120 forms the surface coplanar with the inclined part 220, the camera window 120 may be inclined to form a predetermined with the camera module 110. The camera window 120 may be divided into a projection part 121 and a bezel 122.

The projection part 121 may be provided on the camera window 120 to be transparent so as to allow an external image to be introduced into the camera module 110 mounted inside the inclined part 220. As the camera window 120 and the camera module 110 are provided to be inclined to each other, a predetermined angle may be formed between the camera window 120 and the camera module 110. As the predetermined angle is formed between the camera module 110 and the camera window 120, the projection part 121 may be formed in a shape corresponding to an angle of view (AOV) of the inclined camera module 110 so as to correspond to the AOV to the camera module 110. According to an embodiment of the present disclosure, the projection part 121 may be provided in at least one shape selected among a rectangular shape, a circular shape or a trapezoidal shape according to the inclined angle between the lens assembly and the camera window 120. Specifically, when the camera window 120 is formed in a flat surface and approaches the camera module 110 as going from the lower portion to the upper portion, the projection part 121 may be formed in the trapezoidal shape which is narrowed as going from the lower portion to the upper portion. In an embodiment of the present disclosure, it is described that the projection part 121 is formed in the trapezoidal shape as the camera window 120 is provided to be inclined in relation to camera module 110 as an example, but the present disclosure is not limited thereto. For example, the camera window 120 may be provided on one surface of the camera module 110 to be convexly inclined or concavely inclined. In such a case, the projection part 121 may be formed in a trapezoidal shape having a rounded shape along the peripheral surface thereof to be suitable for the AOV of the camera module 110 which occurs to correspond to the mounted form of the convexly or concavely inclined camera window 120 in the camera module 110. The projection part 121 may be variously modified or changed to correspond to the AOV shape of the camera module 110. For example, the projection part 121 may have a peripheral portion formed in a curved shape rather than in a straight line shape, in addition to being formed in a diamond shape, a rectangular shape, a square shape, a trapezoidal shape, or any other shape, according to, for example, a distance, shape and configuration between the camera module 110 and the camera window 120.

The bezel 122 may be provided around the projection part 121 on the camera window 120 to be opaque. The bezel 122 may be provided to shield a mounting space other than the space where the camera module 110 is mounted. The bezel 122 may be formed on the inner surface of the camera window 120 in any color, such as a black or a metal color according to a design. The bezel 122 may be formed through various methods, such as at least one of printing, spray, or coating.

Figure 6A:
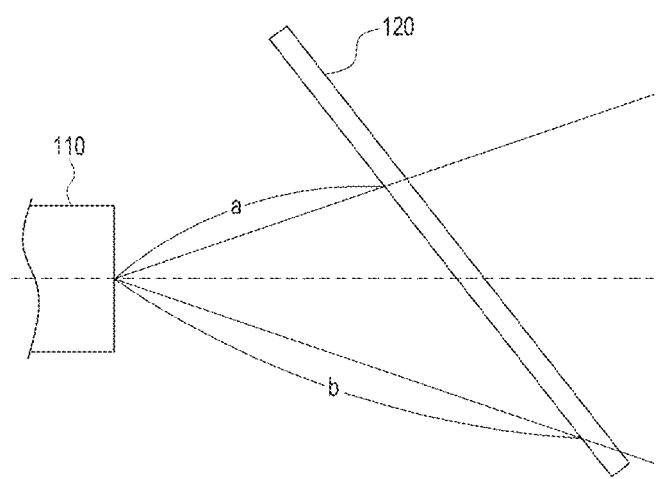
FIGS. 6A and 6B are views schematically illustrating a method of shaping a projection part when a camera window and a camera module are formed to be inclined to each other in an electronic device including a camera device according to various embodiments of the present disclosure.
Figure 6B:
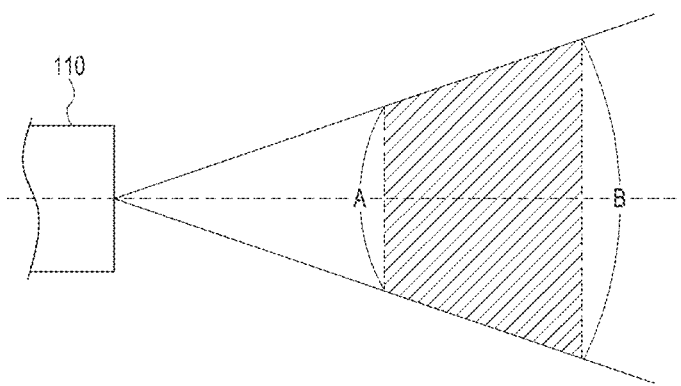

FIGS. 6A and 6B are views schematically illustrating a method of shaping a projection part when a camera window and a camera module are formed to be inclined to each other in an electronic device including a camera device according to various embodiments of the present disclosure.

Referring to FIGS. 6A and 6B, descriptions may be made on a case where the camera window 120 and the camera module 110 are provided to be inclined so that the projection part 121 is formed in a trapezoidal shape according to an embodiment of the present disclosure, as an example. When the distance between the camera module 110 and the camera window 120 and the AOV of the camera module 110 are known, the length A of the top side of the projection part 121 and the length B of the bottom side of the projection part 121 may be calculated. Specifically, it may be assumed that the size of the AOV at the focus of the camera module 110 is "2α", the distance from the focus of the camera module 110 to the top side of the camera window 120 in the AOV range is "a," and the distance from the focus of the camera module 110 to the bottom side of the camera window 120 in the AOV range. At this time, the length A of the top side of the projection part 121 of the trapezoidal shape may be calculated as "A=2a tan α" and the length B of the bottom side of the projection part 121 may be calculated as "B=2b tan α."

In this way, the size of the projection part 121 may be determined based on the size of the AOV of the camera module 110, and the distances from the focus of the camera module 110 to the top side and the bottom side according to the inclination of the camera window 120.

Figure 7:
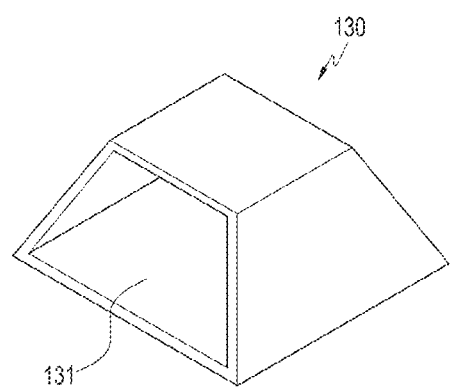
FIG. 7 is a perspective schematically illustrating a shielding member in the electronic device including the camera device according to an embodiment of the present disclosure.

FIG. 7 is a perspective schematically illustrating a shielding member in the electronic device including the camera device according to an embodiment of the present disclosure.

Referring to FIG. 7, the shielding member 130 may be provided between the camera window 120 and the camera module 110. The shielding member 130 may guide an image to the camera module 110, and since the camera window 120, specifically, the projection part 121 and the camera module 110 are mounted to be spaced apart from each other, the shielding member 130 may be provided between the projection part 121 and the camera module 110 to shield the projection part 121 and the camera module 110 from one another. The shielding member 130 is formed to have a cavity 131 of the shape of the projection part 121, specifically, the shape of the AOV, and may be provided in a columnar shape formed to have a top side which is relatively shorter than a bottom side (with reference to FIGS. 5 to 6B). Since the shielding member 130 is formed in the shape of the projection part 121, it is possible to prevent an introduction of stray light or light reflection which may be caused by a space between the camera module 110 and the projection part 121.

The shielding member 130 may be formed of a material capable of preventing the introduction of stray light or light reflection which may be caused by a space between the camera module 110 and the projection part 121, for example, from at least one of a silicon material or a polycarbonate material. In addition, the shielding member 130 may transmit an external image to the camera module 110 through the cavity 131 to be suitable for the AOV of the camera module 110, and may be formed in a color, such as black, to reflect and absorb stray light when the stray light is introduced.

Figure 8:
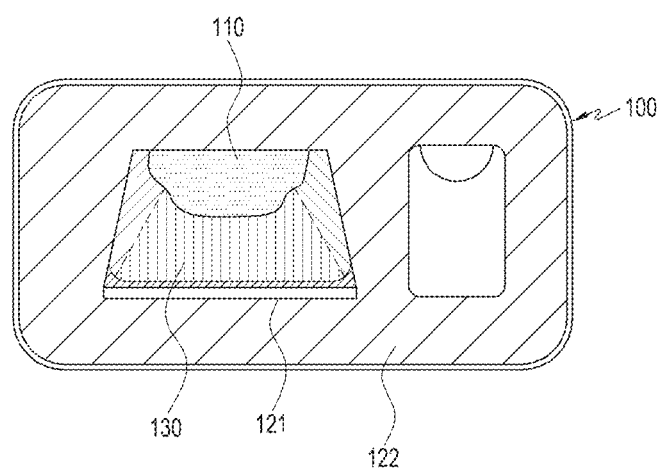
FIG. 8 is a view illustrating a camera device in an electronic device including the camera device according to an embodiment of the present disclosure.

FIG. 8 is a view illustrating a camera device in an electronic device including the camera device according to an embodiment of the present disclosure.

Referring to FIG. 8, according to an embodiment of the present disclosure, the camera window 120 may be formed to be inclined to one surface of the camera module 110, specifically to the front surface of the camera module 110. The projection part 121 formed in the camera window 120 is formed in a shape corresponding to the AOV of the camera module 110, specifically, in the trapezoidal shape, and the shielding member 130 may be mounted between the projection part 121 and the camera module 110. Since the projection part 121 is formed in the trapezoidal shape according to the inclination between the camera window 120 and the camera module 110, the projection part 121 may be formed to correspond to the AOV of the camera module 110. Thus, the introduction of stray light through the projection part 121 can be suppressed. Accordingly, even if the camera module 110 and the camera window 120 are formed to be inclined or to be curved, the user may take a clear photograph to which stray light is not introduced, through the camera module 110.

Descriptions will be made on an embodiment of a shielding member among various embodiments of the present disclosure.

Figure 9:
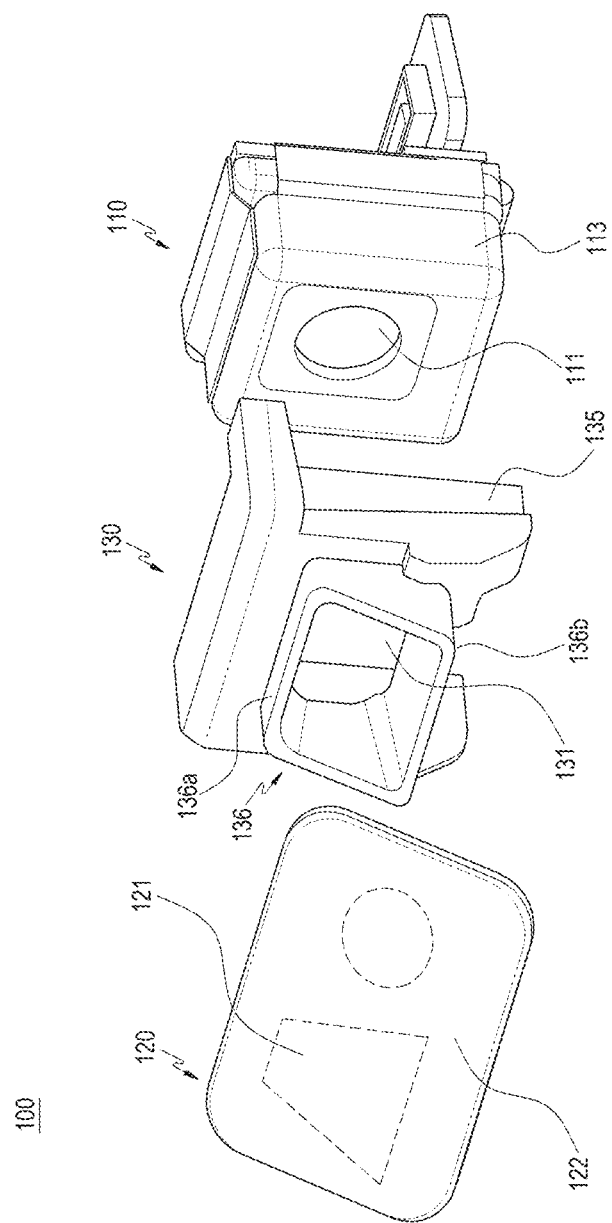
FIG. 9 is a perspective view illustrating a camera device provided with a shielding member according to an embodiment of the present disclosure, in a disassembled state.
Figure 10:
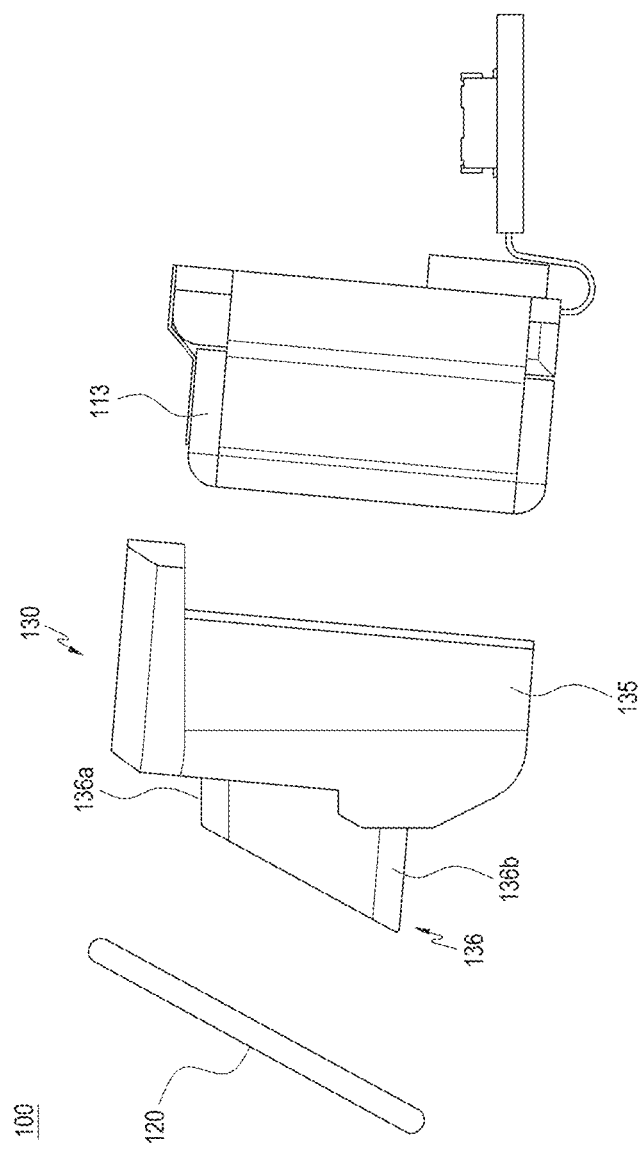
FIG. 10 is a side view illustrating the camera device provided with a shielding member according to an embodiment of the present disclosure, in the disassembled state.
Figure 11:
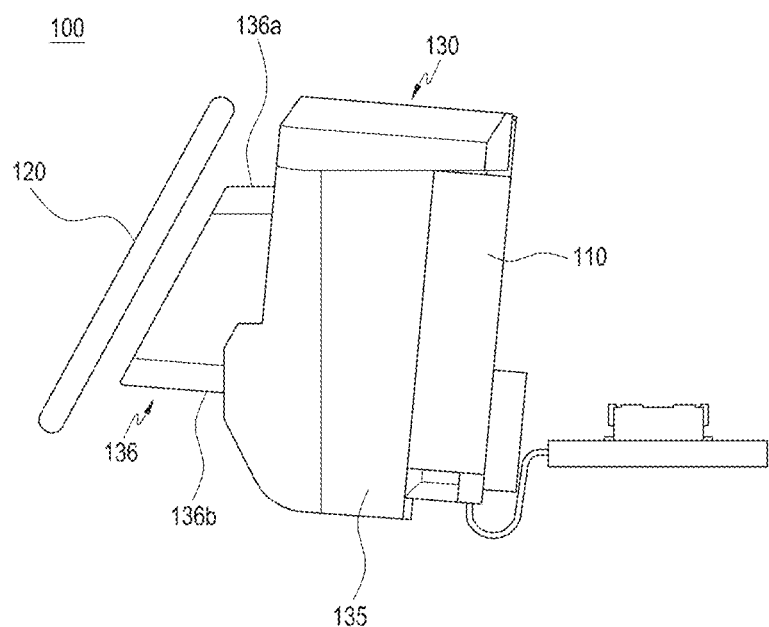
FIG. 11 is a view illustrating the camera device provided with a shielding member according to an embodiment of the present disclosure, in an assembled state.

FIG. 9 is a perspective view illustrating a camera device 100 provided with a shielding member 130 according to an embodiment of the present disclosure, in a disassembled state. FIG. 10 is a side view illustrating the camera device 100 provided with the shielding member 130 according to an embodiment of the present disclosure, in the disassembled state. FIG. 11 is a view illustrating the camera device 100 provided with the shielding member 130 according to an embodiment of the present disclosure, in an assembled state.

Referring to FIGS. 9 to 11, a camera device according to an embodiment of the present disclosure and an electronic device including the camera device include configurations which are the same as those of the camera device described above and the electronic device including the camera device, except for the shielding member. Thus, the forgoing descriptions may be applied to the same components and configurations which are the same as those of the above-described camera device and the electronic device including the camera device, and hereinafter, a part required for the camera device according to an embodiment of the present disclosure and the electronic device including the camera device will be briefly described and different components or configurations may be described in detail.

The electronic device provided with the camera device according to an embodiment of the present disclosure may include a body 210 and an inclined part 220 inclined by a predetermined angle from the body 210, as in the previous embodiment, and may also include a camera window 120 and a camera module 110. In addition, the inclined part 220 may be positioned between the body 210 and a band part, and the camera module 110 to be described below may be mounted inside the inclined part 220 (see FIG. 12 together with FIGS. 4 and 5).

The inclined part 220 may be formed to be inclined by the predetermined angle on the front surface of the camera module 110. An opening 221 may be formed in the inclined part 220, and a camera window 120 may be mounted in the opening 221.

According to an embodiment of the present disclosure, the camera device 100 may include the camera module 110, the camera window 120, and a shielding member 130, as in the previous embodiment of the present disclosure. The camera module 110 may include, for example, a lens assembly 112, a housing 113 that accommodates the lens assembly 112, and a decoration unit (not illustrated). The lens assembly 112 may include, for example, at least one lens module or two or more stacked lens modules, an image module, and a flexible circuit board, and the camera module 110 may also include, for example, a driving unit for autofocusing of the lens module(s) or image correction.

The housing 113 accommodates the lens assembly 112 and may include a lens opening 111 formed on the front surface thereof so that a captured image may be introduced into a lens assembly 112, more specifically into an image sensor through the lens assembly 112.

The camera window 120 is mounted to cover the lens opening 111 so that the camera window 120 may form a surface coplanar to a surface of the inclined part 220. The camera window 120 may be may be divided into a projection part 121 and a bezel 122.

As in the previous embodiment of the present disclosure, the projection part 121 may be provided to be transparent so as to allow an external image to be introduced into the camera module 110. In addition, as the inclined part 220 is inclined on the front surface of the camera module 110, the projection part 121 is formed in an AOV shape at the time of introducing the image into the lens assembly, so as to block stray light introduced from a peripheral part other than the AOV region. In particular, it has been described that the projection part 121 according to an embodiment of the present disclosure is formed in a trapezoidal shape, of which the top side is shorter than the bottom side. For example, when the camera module 110 has a resolution of 1280×1080, the AOV shape may be formed in a truncated pyramid shape of 16:9 when viewed from the front side of the camera module 110, more specifically, the lens assembly. Thus, the projection part 121 may be formed in a trapezoidal shape which is narrowed as going from the lower portion to the upper portion so as to correspond to the AOV shape.

The bezel 122 may be provided opaquely on the camera window 120 around the transparent projection part 121 of the trapezoidal shape. The bezel part 122 may be provided to block an introduction of light or an image so as to prevent the image from being introduced through a portion other than the projection part 121.

Figure 12:
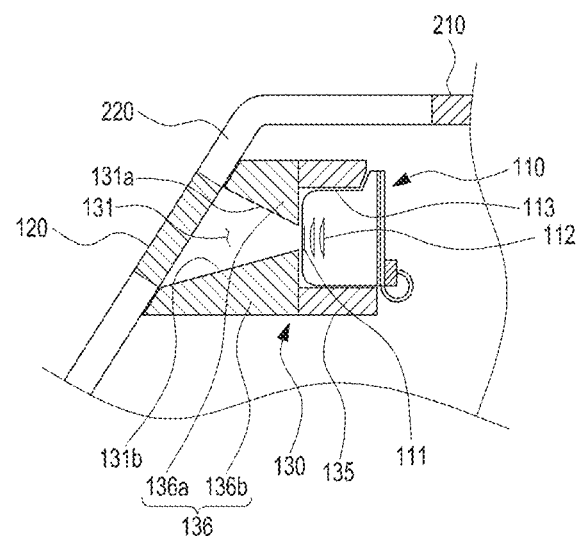
FIG. 12 is a vertical cross-sectional view of a camera device provided with a shielding member according to an embodiment of the present disclosure.
Figure 13:
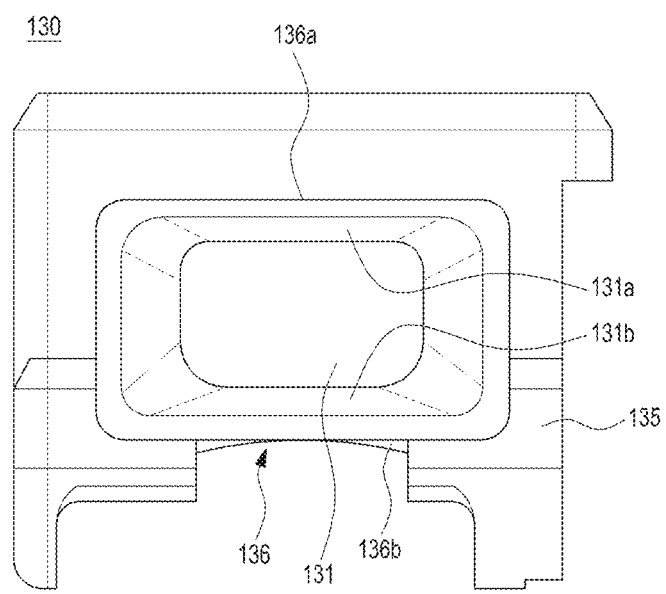
FIG. 13 is a front view illustrating the shielding member according to an embodiment of the present disclosure.
Figure 14:
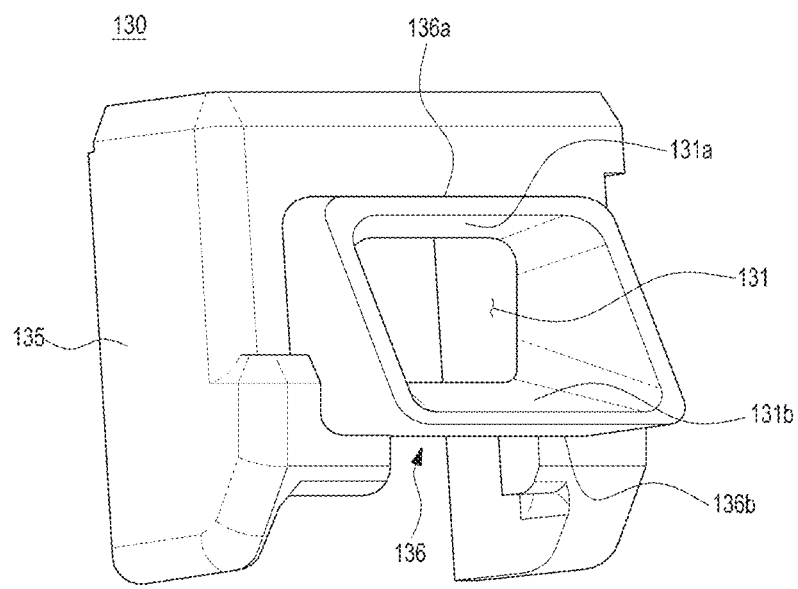
FIG. 14 is a perspective view of the shielding member according to an embodiment of the present disclosure in a different direction.

FIG. 12 is a vertical cross-sectional view of a camera device 100 provided with a shielding member 130 according to an embodiment of the present disclosure. FIG. 13 is a front view illustrating the shielding member 130 according to an embodiment of the present disclosure. FIG. 14 is a perspective view of the shielding member 130 according to an embodiment of the present disclosure in a different direction.

Referring to FIGS. 12 to 14, the shielding member 130 according to an embodiment of the present disclosure may be provided between the camera window 120 and the camera module 110. The shielding member 130 according to an embodiment of the present disclosure may include a body portion 135 and a protrusion 136. As described above, the shielding member 130 according to an embodiment of the present disclosure, that is, the body portion 135 and the protrusion 136 may include at least one of a silicon member or a polycarbonate member.

The body portion 135 may be provided to enclose the camera module 110. The body portion 135 may be formed with a space in which the camera module 110 may be seated and an opening may be formed on the front surface of the body portion 135 to correspond to the lens opening 111.

The protrusion 136 protrudes from the front surface of the body portion 135, and may be provided with a cavity 131 therein. The protrusion 136 may have a length which is varied depending on the distance between the front surface of the housing 113 of the camera module 110 and the inclined part 220. For example, in the present disclosure, the protrusion 136 protrudes from the front surface of the body portion 135 in a square column shape in which the upper surface of the protrusion 136 may protrude to be shorter than the lower surface of the protrusion 136. In addition, both side surfaces of the upper and lower surfaces of the protrusion 136 may be formed to be longer as going from the upper surface to the lower surface. The cavity 131 may be provided such that the length of the side surfaces thereof also increases as going from the upper surface to the lower surface.

The front part of the protrusion 136 may be provided to be in close contact with peripheral portion of the rear surface of the projection part 121, and to shield a gap between the inner surface of the projection part 121 and the body portion 135 so as to block an introduction of stray light, other than a captured image, into the camera module 110.

The protrusion 136 may have a protrusion length between the body portion 135 and the camera window 120, in which the protrusion length may be varied depending on the distance between the camera module 110 and the inclined part 220. As in an embodiment of the present disclosure, the protrusion 136 may be formed in a square column shape, of which the length of the top surface is different from that of the bottom surface. Specifically, since the distance between the front surface of the camera module 110 and the camera window 120 increases as going from the top surface to the bottom surface of the camera module 110, the protrusion length of the bottom surface 136b of the protrusion 136 may be formed to be longer than the protrusion length of the top surface 136a of the protrusion 136, and both side surfaces of the protrusion 136 may be formed such that the length thereof gradually increases as going from the upper portion to the lower portion.

The cavity 131 is formed within the protrusion 136, and may be positioned between the projection part 121, more specifically, the rear surface of the projection part 121 and the lens opening 111. The cavity 131 may be provided such that the front portion thereof has a size corresponding to the peripheral portion of the projection part 121 and the rear portion thereof has a size corresponding to the size of the lens opening 111. In addition, the cavity 131 may form a space in an AOV shape between the size of the projection part 121 at the front side thereof and the size of the lens opening 111 at the rear side thereof. Since the AOV shape according to an embodiment of the present disclosure is formed in a truncated pyramid shape, the cavity 131 may be formed in a truncated pyramid shape which is gradually narrowed as going from the projection part 121 to the lens opening 111.

The cavity 131 is a through-hole formed within the protrusion 136 and having the AOV shape. Like the protrusion 136, the protrusion length of the cavity 131 may be varied between the projection part 121 and the lens opening 111 depending on the distance between the camera module 110 and the inclined part 220.

As in the embodiment of the present disclosure described above, as the distance between the front surface of the camera module 110 and the camera window 120 increases as going from the top surface to the bottom surface of the camera module 110, the protrusion 136 is formed in a square column shape, of which the top surface and the bottom surface have different lengths, and the cavity 131 may be provided in a truncated pyramid shape, in which the protrusion lengths of the upper inner surface 131a and the protrusion length of the lower inner surface 131b are different from each other and the cavity 131 is narrowed as going from the front side to the rear side.

As an example, it has been described that the shielding member 130 according to an embodiment of the present disclosure includes the body portion 135 and the protrusion 136, but the shielding member 130 is not limited thereto. The shielding member 130 may be variously modified or changed. For example, the shielding member 130 may include only the protrusion 136 having a cavity 131 formed at the front side of the housing 113.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
   a body of the wearable electronic device;
   a display device provided with the body;
   an inclined part bent from the body, provided to be inclined on the body, forming an opening, and comprising:
      a camera module disposed inside the inclined part; and
      a camera window provided on the opening to cover the camera module,
   wherein the camera window is provided with the wearable electronic device, the camera window including a transparent projection part corresponding to an angle of view (AOV) of the camera module and an opaque bezel around the transparent projection part, and
   wherein a shape of the transparent projection part is configured to reduce stray light or light reflection that reaches the camera module.

2. The wearable electronic device of claim 1, wherein the transparent projection part comprises a shape selected from one of a circular shape, a rectangular shape, or a trapezoidal shape.

3. The wearable electronic device of claim 1, further comprising a shielding member disposed between the camera window and the camera module,
   wherein the shielding member comprises a shape corresponding to the AOV and passes therethrough an image to the camera module.

4. The wearable electronic device of claim of claim 3, wherein the shielding member comprises one of a silicon material or a polycarbonate material.

5. A wearable electronic device comprising:
   a body of the wearable electronic device configured to be connected a wrist band;
   a display device provided with the body;
   an inclined part bent from the body, provided to be inclined on the body, forming an opening, and comprising:
      a camera module disposed inside the inclined part and provided with a lens assembly,
      a camera window provided on the opening, and positioned in a direction of the camera module to be inclined by a predetermined angle,
      a projection part formed on the camera window and having a size corresponding to an angle of view (AOV) of the camera module,
      a shielding member disposed between the camera window and the camera module, and
      a cavity disposed in the shielding member and comprising an AOV shape so that one side of the cavity corresponds to the projection part and an other side of the cavity corresponds to a lens opening of the lens assembly,
   wherein a shape of the projection part is configured to reduce stray light or light reflection that reaches the camera module.

6. The wearable electronic device of claim 5, wherein the projection part comprises a trapezoidal shape.

7. The wearable electronic device of claim 6, wherein the shielding member includes:
   a body portion that encloses the camera module; and
   a protrusion protruding from a front surface of the body portion, and adapted to be mounted to an inner surface of the camera window, the cavity being disposed in the protrusion.

8. The wearable electronic device of claim 7,
wherein the protrusion is mounted to a periphery of a rear surface of the projection part, and
wherein a protrusion length of a bottom surface of the protrusion is longer than a protrusion length of a top surface of the protrusion so that the protrusion is provided to have a length varied between the camera window and the body portion.

9. The wearable electronic device of claim 8,
wherein the cavity is disposed between the projection part and the lens opening,
wherein a protrusion length of a lower inner surface of the cavity is longer than a protrusion length of an upper inner surface of the cavity so that the cavity is provided to have a length varied between the camera window and the body portion, and
wherein a front side of the cavity comprises a size corresponding to that of the projection part, and a rear side of the cavity comprises a size corresponding to that of the lens opening.

10. The wearable electronic device of claim 9, wherein the cavity comprises a truncated pyramid shape.

11. The wearable electronic device of claim 5, wherein the shielding member includes at least one of a silicon member or a poly carbonate member.

\* \* \* \* \*